United States Patent [19]

Bespalov et al.

[11] Patent Number: 4,629,633

[45] Date of Patent: Dec. 16, 1986

[54] COMPOSITION AND METHOD FOR PROTECTION OF LIQUID SURFACE FROM HEAT- AND MASS-TRANSFER IN LIQUID GAS SYSTEM

[75] Inventors: Anatoly A. Bespalov, Chelyabinsk; Talgat Z. Khuramshin, Moscow; Nikolai A. Bespalov; Andrei N. Efimov, both of Chelyabinsk; Marina S. Vilesova; Lev E. Gendlin, both of Leningrad; Vladimir I. Lukhovitsky; Vladimir V. Polikarpov, both of Kaluzhskaya, all of U.S.S.R.

[73] Assignee: Chelyabinsky Politekhnichesky Institut Imeni Lininskogo Komsomola, Chelyabinsk, U.S.S.R.

[21] Appl. No.: 714,007

[22] Filed: Mar. 20, 1985

[51] Int. Cl.$^4$ .................. B01J 1/18; B05D 5/00; B65D 88/40

[52] U.S. Cl. .................. 427/154; 210/710; 220/218; 252/382; 252/383; 252/384; 422/41; 422/42; 422/43; 523/219

[58] Field of Search .................. 427/41; 422/42, 43, 422/41; 252/382, 383, 384; 220/218; 210/710; 523/219

[56] References Cited

U.S. PATENT DOCUMENTS

| | | | |
|---|---|---|---|
| 2,797,141 | 6/1957 | Veatch | 422/42 |
| 3,939,662 | 2/1976 | Volz | 427/136 |
| 3,993,443 | 11/1976 | Guenthner | 422/43 |
| 4,035,149 | 7/1977 | Scott et al. | 220/218 |
| 4,106,906 | 8/1978 | Moore et al. | 422/43 |
| 4,238,536 | 12/1980 | Koch | 427/154 |
| 4,250,140 | 2/1981 | Rowlette | 422/43 |
| 4,326,986 | 4/1982 | Canevari | 422/42 |
| 4,356,969 | 11/1982 | Obermayer et al. | 239/56 |
| 4,383,868 | 5/1983 | Braley | 210/728 |
| 4,418,098 | 11/1983 | Maistrovich | 427/203 |
| 4,420,400 | 12/1983 | Weitzen | 210/728 |
| 4,537,179 | 8/1985 | Wilkins et al. | 422/43 |

FOREIGN PATENT DOCUMENTS 45-37290  11/1970  Japan ..................... 422/43

Primary Examiner—Herbert J. Lilling
Attorney, Agent, or Firm—Burgess, Ryan & Wayne

[57] ABSTRACT

A composition for protection of the liquid surface from heat- and mass-transfer, for example from evaporation, contains a polymer limitedly swelling in the protected liquid or a mixture of said polymer with a neutral filler having a density lower than the density of the protected liquid.

A method for protection of the liquid surface from heat- and mass-transfer comprising application of said composition on the surface of a liquid, for example petroleum, in an amount of from 0.1 to 2 kg per m$^2$. Upon contacting of the polymer with the liquid the polymer rapidly swells and forms a continuous gel-like covering which hinders the heat- and mass-transfer on the liquid surface.

4 Claims, 4 Drawing Figures

COMPOSITION AND METHOD FOR PROTECTION OF LIQUID SURFACE FROM HEAT- AND MASS-TRANSFER IN LIQUID GAS SYSTEM

FIELD OF THE INVENTION

The present invention relates to the art of storage of liquid media and, more specifically, it relates to a composition and method for protection of the liquid surface from heat- and mass-transfer in the liquid-gas system.

It is known that during prolonged storage of liquids, especially high-volatile ones such as gasoline, acetone, alcohol, a considerable portion of the liquid evaporates as a result of heat-and-mass transfer processes occurring at the liquid surface and associated with transition of molecules from the liquid phase into the gas one and vice versa and becomes irreversibly lost thus polluting the ambient air.

In addition to quantitative losses in the course of storage of multicomponent liquids, their undesirable qualitative changes are observed which are caused by evaporation of mainly high-volatile components. The impaired quality of the liquid product provides a detrimental effect on its operation properties.

The quality of liquid products is impaired also upon their contact with air. For instance, the interaction of petroleum and petroleum products with air oxygen results in oxidation of hydrocarbons and their compounds. The process of oxidation of unstable components results in contamination of petroleum products with mechanical impurities and resins.

The rate of oxidation of petroleum products resulting in the formation of resins and residues is proportional to the concentration of the reactants and depends directly on the intensity of the process of mass-transfer of oxygen from the gas phase into the liquid. The rate of air dissolution in petroleum products depends on the composition and temperature of the gas and liquid phases, as well as on the surface area of the interface between these phases.

Therefore, the process of heat- and mass-transfer occurring at the interface in the gas-liquid system result not only in losses of liquid products, but also in an impaired quality of these products. In this respect the protection of surfaces of liquid products from heat- and mass-transfer is one of the most urgent problems. This problem is especially critical in storage of oil and petroleum products.

BACKGROUND OF THE INVENTION

Known in the art are a composition and a method for preventing evaporation losses of petroleum and petroleum products by means of a floating covering of microcapsules (cf. U.S. Pat. No. 2,023,308 Cl.220–26; Oil and Gas J., 1953, v. 52 No. 10, p. 74–75; Oil and Gas J., 1955, v. 54 No. 23, pp. 248–251; Petroleum Times, 1960, v. 67, No. 1652, p. 824). The protective covering comprises a bulk material consisting of hollow microspheres with a diameter of $6 \times 10^{-6}$ to $9 \times 10^{-5}$ m filled with an inert gas. The thickness of the covering is equal to $25 \times 10^{-3}$ m. U.S. Pat. No. 3,146,060 points out that covering of the surface of gasoline with microspheres according to U.S. Pat. No. 2,023,308 does not reduce, but on the contrary, intensifies the process of evaporation of gasoline due to the capillary effects as compared to evaporation of gasoline without such a covering. The above-specified U.S. Pat. No. 3,146,060 teaches a composition and a method for protection of the surface of petroleum products, wherein for the minimization of the capillary effects in the covering the microspheres should be coated with surface-active substances or surfactants such as silicon or fluorocarbon. This treatment is intended for preventing the microspheres from wetting and thus for reducing the capillary effects. However, this technique has proved to be less effective. After placing the microspheres onto the surface of a crude oil during the first few days the efficiency of protection from evaporation did not exceed 60%. This composition turned to be unsuitable for the protection of lightweight petroleum products from evaporation (cf. Chemical Engineering, 1960, v. 67, No. 25, p. 88). Also noted are other disadvantages of this composition. For example, microspheres are admitted into a tank together with the petroleum stream and then after intermixing with petroleum they ascend forming a layer of non-uniform thickness. Upon pumping petroleum out of the tank some portion of the microspheres is withdrawan from the tank and another portion sinks to the bottom. As a result, separate areas, not covered with the microspheres or covered with a layer of inadequate thickness appear on the surface of petroleum. This hinders operation of petroleum reservoirs and makes it rather more expensive in the storage of petroleum products. In this connection, this mode of protection of the surface of petroleum products from evaporation has not found extensive use in the art.

Currently employed is the protection of petroleum and petroleum products from evaporation by means of pontoons floating on the surface of petroleum products or floating roofs. A sealing unit is provided between the reservoir walls and the pontoon or the floating roof over the periphery thereof so that the area of evaporation of petroleum products is reduced to the minimum possible value. In the world practice up to 200 different types and sizes of such sealing units are known which can be classified as hard and soft ones.

A hard (mechanical) sealing unit consists of lever-type metallic members; soft (flexible) sealing units are made of a rubberized fabric or a polyurethane foam. It should be noted that in the case of using soft sealing units a strict monitoring of the pressure of the stored liquid medium is required since without it no reliable sealing of the unit can be ensured. Operation of such sealing units is rather complicated. Hard-type sealing units are neither sufficiently reliable and call for frequent inspection. Some parts of the sealing unit undergo corrosion and must be replaced with new ones from time to time. In addition to the above-mentioned disadvantages of mechanical means for protection of the liquid surface from evaporation still other disadvantages should be noted, namely: the use of expensive materials (metals, gasoline-resistant rubber), high labour expenditures, strict requirements to the design of the sealing unit, its manufacture, assembling and use and ah high production cost of such units.

The operation or pontoons shows that deviation of a reservoir from cylindricity along its axis results in a substantial decrease of the protective function of the pontoon. Therefore, none of the prior art protective means meets the requirements imposed on them in storage of petroleum products.

OBJECT OF THE INVENTION

It is an object of the present invention to provide such a composition for protection of the liquid surface from heat- and mass- transfer in the liquid-gas system which would be of a high efficiency, available, inexpensive and convenient in operation and to develop such a method of protection of the liquid surface from heat- and mass-transfer which would be simple and readily implemented on a commercial scale.

SUMMARY OF THE INVENTION

This object is accomplished by the provision of a composition for protection of the liquid surface from heat- and mass- transfer in the liquid-gas system incorporating a dispersed material, wherein according to the present invention, as the dispersed material it comprises a polymer limitedly swelling in the protected liquid.

The present invention makes it possible to more effectively protect the surface of liquid media, from evaporation as compared to the known means. This helps to diminish pollution of the environment. Furthermore, the present invention makes it possible to preserve the quality of the liquid product. A high effectiveness of the composition according to the present invention is explained by the fact that particles of the polymer upon its contact with the liquid rapidly swell and form a continuous gel-like protective covering which prevents the liquid from evaporation quite satisfactorily. The composition accoring to the present invention is reliable in operation owing to its good spreadability over the protected surface, it wets well the material of the reservoirs and remains efficient for a long period.

For protection of the liquid surface from heatand mass transfer in the case of the liquid density lower than that of the employed polymer, it is necessary to mix the polymer with a filler neutral to the protected liquid and having a density lower than that of the protected liquid in a mass ratio of the polymer to the filler ranging from 1:1 to 1:10.

The present invention also relates to a method for protection of the liquid surface from heat- and masstransfer in a gas-liquid system which comprises placing a dispersed material onto the surface of the liquid to be protected, wherein, according to the present invention as the dispersed material the abovementioned composition is used, i.e. a polymer limitedly swelling in the protected liquid or a mixture of the polymer with a neutral filler having a density lower than that of the protected liquid, this composition being used in an amount of from 0.1 to 2.0 kg per m² of the surface of the protected liquid; upon contacting the liquid this polymer rapidly swells and forms a continuous gel-like covering which hinders the heat- and mass-transfer.

The method according to the present invention is easy to perform and makes it possible to rapidly form a protective covering on the liquid surface; it requires no high capital investments and can be readily implemented on a commercial scale.

These and other advantages of the present invention will now be more fully apparent from the following detailed description.

DETAILED DESCRIPTION OF THE INVENTION

As it has been mentioned hereinbefore, as the means for protection of the liquid surface from heat- and masstransfer, in particular from evaporation, the present invention suggests a composition containing a polymer limitedly swelling in the liquid to be protected.

By the term "a polymer limitedly swelling" we means any polymer possessing the property to partly absorb a liquid, i.e. the polymer should not be fully dissolved in the liquid to be protected.

A polymer with a limited swelling capacity can be found in appropriate reference literature, or chosen with due regard for the solubility parameters of the protected liquid and the polymer, or calculated using molecular attraction constants or prepared from polymers fully soluble in the protected liquid by way of cross-linking them by a known chemical method (by introducing various additives) or by a known physical method (radiation cross-linking)

Therefore, a wide range of polymers can be used, for example copolymers of ethylene, polybutylacrylate, copolymers of butylacrylate and acrylonitrile, polyvinyl alcohol, fluorinated rubber, polyacrylamide and other suitable polymers and copolymers.

The polymer is used in the form of fine particles with sizes varying within a broad range, its upper limit not exceeding $10^{-3}$ m. The majority of the polymers are commercial products and available in large quantities.

The polymer specially selected for the protected liquid and limitedly swelling therein constitutes the protective agent which is placed on the surface of the liquid in an amount of from 0.1 to 2 kg per m² of the surface. This amount is taken due to the fact that the amount of the agent less than 0.1 kg will not ensure a continuous gel-like protective covering and, therefore, is insufficient. In the amount of more than 2 kg the protective gel according to the present invention will not bring about any additional increase of its efficiency but may bring about additional costs.

Upon contacting with the liquid the polymer particles rapidly swell and aggregate together thus forming a continuous gel-like covering which predudes capillary effects usually occurring in the case of using the prior art protective composition.

Owing to good spreadability of the gel-like covering the possibility of formation of individual non-protected areas on the liquid surface is totally eliminated.

Furthermore, owing to good spreadability, the gel-like covering follows the geometry of the storage tank, thus ensuring its reliable service. Since it has a good adherence, the gel-like covering adheres well to the tank walls, thus excluding the formation of a clearance between the protective covering and the walls of the tank during the storage of the liquid therein.

The composition according to the present invention makes it possible to ensure an effective protection against heat- and mass-transfer, of substantially any liquid in the liquid-gas system, since the rate of heat- and mass-transfer processes are defined by a relatively low rate of molecular diffusion through the gel-like covering and the convection-type heat- and mass-transfer through the liquid-gas interface is substantially excluded.

As the protected liquids both polar and nonpolar, combustible and non-flammable organic liquids can be used, for example oil and petroleum products, alcohols, ketones, aromatic and aliphatic hydrocarbons, halogenated liquids, water, and the like.

As it has been mentioned hereinbefore, for an effective protection from heat- and mass-transfer it is necessary that the composition be located on the surface of the liquid, i.e. it should have a density lower than that of the protected liquid.

In the case of the polymer density higher than the density of the protected liquid, the polymer is mixed with a light filler neutral to the protected liquid, for example with hollow glass capsules. This provides buoyancy of the protective covering on the liquid surface.

Thus, for protecting heavy oils having a density $\rho = 970$ kg/m$^3$ it is possible to use a composition containing a copolymer of ethylene and propylene with the density $\rho = 865$ kg/m$^3$. But in the case of protecting light crude oils having a density of 700–800 kg/m$^3$ this copolymer must be mixed with a light filler neutral to said light crudes oils the filler making the protective composition buoyant.

As the filler different materials can be used, such as glass, silicate, phenol-formaldehyde, gelatin, polyethylene or polystyrene capsules, as well as other suitable materials with a density lower than the density of the liquid to be protected.

The polymer is mixed with the filler in a mass ratio ranging from 1:1 to 1:10. A particular ratio is chosen within this range, depending on the degree of an equilibrium swelling of the polymer in the protected liquid, density and particle size of the filler. The desired effect will not be achieved if the ratio of the polymer and the filler is not within the above-specified range. If the content of the filler is smaller than the content of the polymer in the mixture, the protecting composition loses its buoyancy.

If the content of the filler in the mixture is over 1:10 the continuity of the protecting gel-like covering is distrubed.

The obtained mixture of the polmer and the filler is placed onto the surface of the protected liquid in an amount of from 0.1 to 2.0 kg per m$^2$ of the surface. A continuous gel-like protecting covering is formed in much the same manner as in the case of using a polymer without a filler.

The protecting composition according to the present invention can be placed onto the surface of the protected liquid by any known means and methods. It can be introduced into a tank together with the stream of the liquid, or through a lateral manhole of the tank or through an inspection port, through the hatch on the tank top directly onto the surface of the liquid.

The above-mentioned advantages of the agent for protecting the liquid surface from heat-and masstransfer according to the present invention give grounds for a conclusion that it is commercially advantageous over other prior art methods and means including pontoons.

For a better understanding of the present invention, some specific examples illustrating the composition of the present invention and the use thereof are given hereinbelow.

EXAMPLE 1

A composition is produced by mixing 1 part by mass of a polymer with 3 parts by mass of a filler. As the polymer use is made of a dispersed cross-linked copolymer of butyl acrylate and acrylonitrile in a mass ratio of 88:12. As the filler hollow glass capsules with a density of 300–350 kg/m$^3$ are used. In this Example, as well as in all other Examples, the polymer particle size or dispersity is within the range of from $10^{-7}$ to $10^{-3}$ m, while particle size of the filler is within the range of from $4 \times 10^{31}$ $^5$ to $8 \times 10^{-4}$ m.

The resulting composition is tested for estimating the degree of gasoline surface protection from evaporation losses. To this end, two $2 \times 10^{-3}$ m$^3$ beakers have been filled with $1,53 \times 10^{-3}$ m$^3$ of gasoline each. The tests have been conducted at the temperature of 22° C. under the conditions of stationary air over the evaporation surface. In one beaker onto the surface of gasoline the above-mentioned composition is placed in the amount of 1 kg per m$^2$ of the surface of gasoline. Another beaker with gasoline is used as a control. In the beaker containing the composition accoring to the present invention a continuous gellike covering has rapidly formed due to swelling of the copolymer. The degree of the equilibrium swelling of the copolymer is 20. The formed gel-like covering reliably protects the surface of gasoline from evaporation losses.

For comparing the protective properties of the composition according to the present invention the data on the protective properties of the agents according to U.S. Pat. Nos. 3,146,060 and 2,023,308 are given hereinbelow.

Tests of the composition according to the present invention have been conducted under the same conditions as those specified in U.S. Pat. No. 3,146,060 wherein the data on the protective agent according to U.S. Pat. No. 2,023,308 are cited as well.

The data on evaporation losses of gasoline are given in Table 1 hereinbelow.

As it follows from Table 1, losses of gasoline in the case of using the preparation according to the present invention are much lower than in the control, as well as in the case of the prior art agents. This allows a conclusion to be made that the composition according to the present invention is highly effective. In this Example the effectiveness of protection of gasoline from evaporation losses is 93%.

TABLE 1

| Time hours | Losses of gasoline, percent | | | |
|---|---|---|---|---|
| | Composition of this invention | Agent of U.S. Pat. No. 2,023,308 | Agent of U.S. Pat. No. 3,146,060 | Control |
| 21 | 1.1 | 35 | 7.5 | 42.5 |
| 93 | 4.4 | 90 | 20 | 68.5 |
| 117 | 5.5 | 100 | 25 | 72.5 |

By the term "effectiveness" one should understand the reduction of losses of the protected liquid determined by the formula:

$$E = \frac{L - L_p}{L} \cdot 100, \text{ wherein:}$$

E—effectiveness of protection, in per cent;
L—evaporation losses of the liquid without protection, kg;
L$_p$—evaporation losses of the liquid with the use of a protective agent, kg.

EXAMPLE 2

A composition is prepared by mixing 1 part by mass of a polymer and 5 parts by mass of a filler. As the polymer a cross-linked copolymer of ethylene, propylene and bicyclopentadiene is used in a mass ratio of the monomers of 66:32:2 respectively. As the filler hollow silicate capsules with a density of 250–350 kg/m$^3$ are used.

The procedure of testing this agent is conducted in a manner similar to that described in Example 1, except that kerosene is used as the protected liquid. The amount of the agent placed on the surface of kerosene is taken at the rate of 0.5 kg per m² of the surface. The degree of the equlibrium swelling of the polymer is 30. The effectiveness of protection of kerosene from evaporation losses is 82%.

EXAMPLE 3

A composition is prepared by mixing 1 part by mass of a polymer with 4 parts by mass of a filler. As the polymer a cross-linked copolymer of butylacrylate and acrylonitrile is used in a mass ratio of the monomers of 88:12. The filler comprises hollow gelatine capsules having a density of 200 to 300 kg/m³.

The procedure for testing the protective agent of this Example is similar to that described in the foregoing Example 1, except that as the protected liquid toluene is used. The amount of the composition is selected to be 1.5 kg per m² of the surface. The degree of the equilibrium swelling of the polymer is 40. The effectiveness of protection of toluene from evaporation losses is 93%.

EXAMPLE 4

As the protective composition a cross-linked copolymer of ethylene with propylene is used. This polymer is placed onto the surface of carbon tetrachloride in the amount of 2 kg per m² of the surface. The degree of the equilibrium swelling of the polymer in this liquid is 50. The effectiveness of protection of carbon tetrachloride from evaporation losses is 89%.

EXAMPLE 5

A composition is prepared by mixing 1 part by mass of a polymer and 10 parts by mass of a filler. As the polymer a butylacrylate rubber is used. The filler comprises hollow glass capsules having a density of 290–350 kg/m³. This agent is placed onto the surface of gasoline in an amount of 1.5 kg per m² of the surface and the testing procedure is effected as described in Example 1 hereinbefore. The degree of the equilibrium swelling of the polymer is 25. The effectiveness of protection of gasoline from evaporation losses is equal to 92%.

EXAMPLE 6

A composition is prepared consisting of 1 part by mass of a polymer and 1 part by mass of a filler. The polymer is a cross-linked copolymer of ethylene and propylene. The filler is composed of hollow glass capsules having a density of 250 to 300 kg/m³. This composition is placed onto the surface of gasoline in the amount of 1 kg per m² of the surface and the testing procedure is conducted under conditions similar to those of Example 1 hereinbefore. The degree of equilibrium swelling of the polymer is 200. The effectiveness of protection of gasoline from evaporation losses is 88%.

EXAMPLE 7

A composition is prepared consisting of 1 part by mass of a polymer and 2 parts by mass of a filler. The polymer is a cross-linked copolymer of vinylidene fluoride and perfluoromethylvinyl ether. The filler is composed of hollow glass capsules having a density of 200 to 250 kg/m³. This agent is placed onto the surface of acetone at the rate of 2 kg per m² of the surface and the testing procedure is effected under conditions similar to those of Example 1 hereinbefore. The degree of the equilibrium swelling of the polymer is 25. The effectiveness of protection of acetone from evaporation losses is 93%.

EXAMPLE 8

This Example illustrates the effect of the protective composition on the rate of evaporation of gasoline in a closed volume. Two vessels each of $4 \times 10^{-3}$ m³ capacity are filled with gasoline. In one vessel the protective agent according to Example 1 is placed in the amount of 1 kg per m² of the surface. Both vessels are sealed. The testing data are shown in FIG. 1, wherein gasoline vapour pressure versus time is plotted.

Curve 1 shows the gasoline vapour pressure variations over the open i.e. non-protected surface of gasoline, while curve 2 shows the gasoline vapour pressure variations over the surface covered with said protective composition.

As it is seen from FIG. 1, the composition according to the present invention considerably lowers the rate of increase of gasoline vapour pressure over gasoline surface.

EXAMPLE 9

This Example illustrates the selective effect of the protective composition depending on the nature (molecular mass) of the components incorporated in the liquid protected from the heat and mass-transfer.

Two vessels of 2,000 m³ capacity each are filled wth 1,300 m³ of gasoline. Into one of them a protective agent is placed which has the composition mentioned in Example 1 hereinbefore, in the amount of 1.5 kg per m² of the surface. Then both vessels are sealed.

Samples of the gas phase are taken from both vessels every 2 hours during 9 days and their chemical composition is chromatographically determined. The coefficient of selectivity (K) is calculated from the results of the analysis depending on the molecular mass (M) of each component. The value of $K_i$ shows the factor by which the concentration of the i-th component in the gas phase in the vessel provided with a protective covering is smaller than the content of the same component in the control vessel, i.e. with no covering. This relationship is shown diagrammatically in FIG. 2. It demonstrates the ability of the composition according to the present invention to hinder evaporation of high-volatile gasoline fractions with a molecular mass ranging from 90 to 70 and points to a considerable increase of the protective properties of the composition according to the present invention as one goes to more volatile (light-weight) gasoline fractions with a molecular mass within the range of 70 to 44.

EXAMPLE 10

This Example illustrates the protective effect of the composition according to the present invention relative to the mass transfer from the gas phase into the liquid.

Two vessels with the capacity of 0.014 m³ each are filled with kerosene to such an extent that the ratio of the volume of the gas space to that of kerosene be equal to 1:12. In one vessel on the surface of kerosene the composition according to Example 2 is placed in the amount of 1.5 kg per m² of the surface. The degree of the equilibrium swelling of the polymer in kerosene is 30. Air is supplied into both vessels to the pressure of 0.69 MPa and then both vessels are sealed. The second vessel serves as the control. Both vessels are heattreated under the following conditions: heated from 10° to 40° C. for 60 minutes then kept at the temperature of 40° C. for 30 minutes, whereafter cooled to 10° C. from 40° C. for 50 minutes and then maintained at the temperature of 10° C. for 30 minutes. Three more cycles have been run under such conditions.

The results of tests of the temperature effect of the protective coating are shown in FIGS. 3 and 4.

Figure 3:
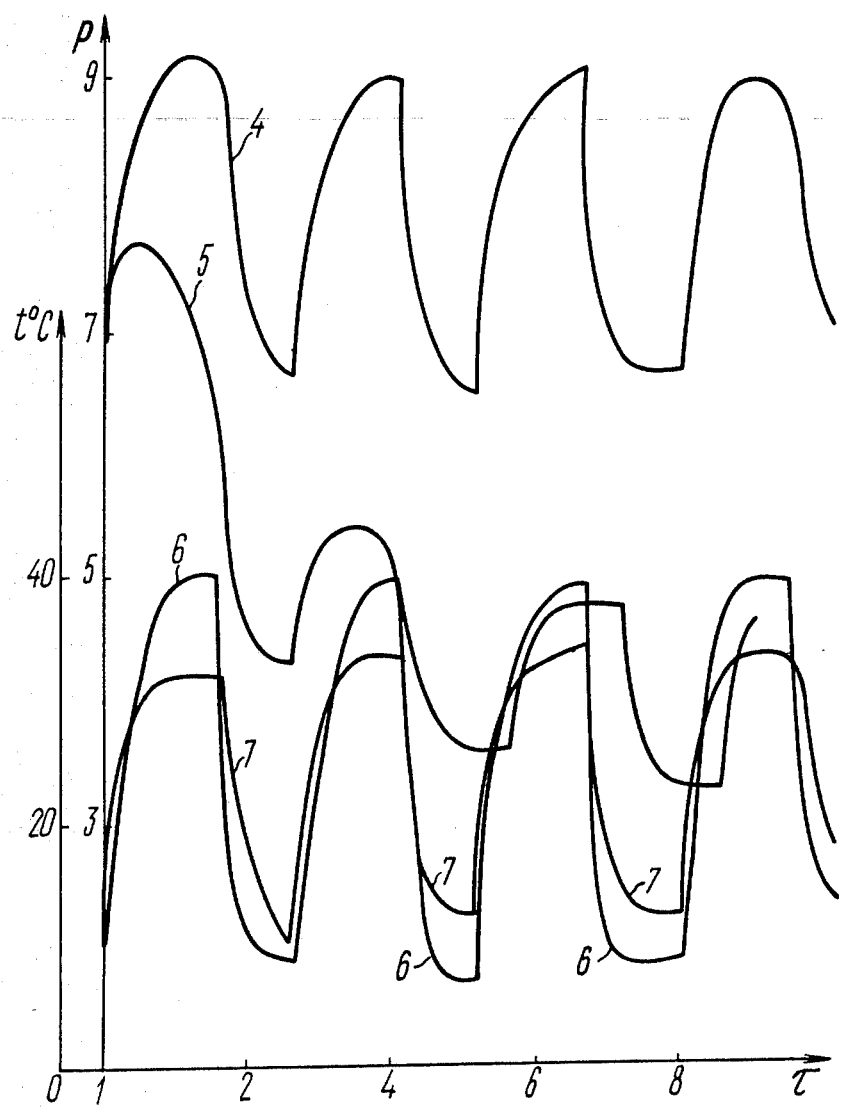
FIG. 3 shows a plot of pressure (P) and the temperature (t) variations of the gas and liquid phases vs. time ($\tau$) in the vessel with the protective covering and in the control vessel.

Curve 4 in FIG. 3 shows variations of pressure (P) in the gas phase in the vessel with the protective covering while curve 5 shows variations of pressure (P) of the gas phase in the control vessel.

Curve 6 shows variations of temperature (t) of the gas phase in the vessel with the protective covering while curve 7 demonstrates variations of temperature (t) of the liquid phase in both vessels.

Figure 1:
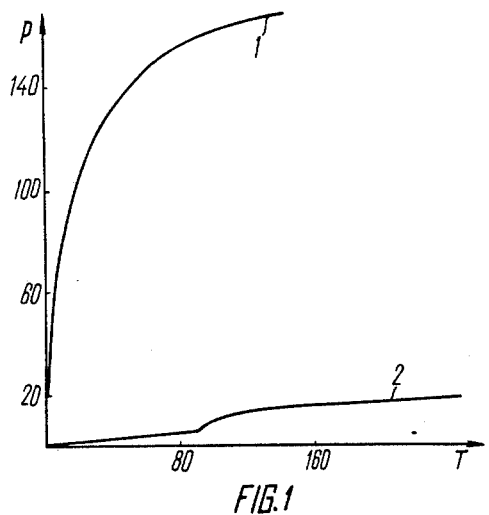
Figure 2:
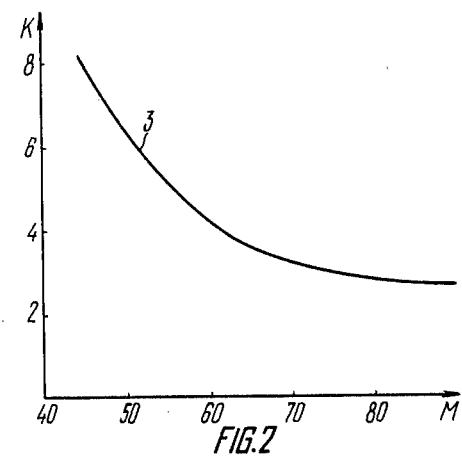
Figure 4:
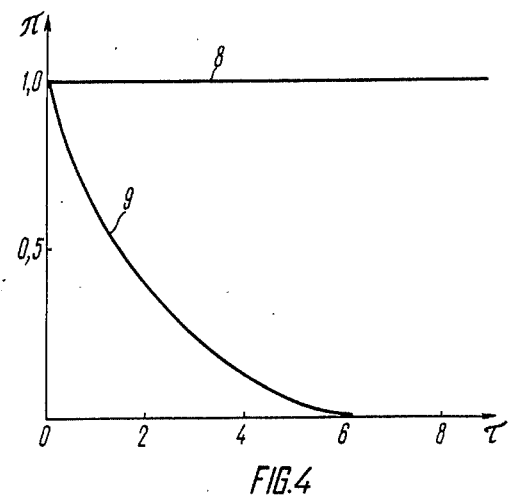
FIG. 4 shows a plot of the degree of completeness of air dissolution of ($\pi$) in kerosene vs. time ($\tau$) in the vessel with the protective covering and in the control vessel.

Curve 8 in FIG. 4 shows the degree of completeness of the air dissolution process ($\pi$) in the vessel with the protective covering while curve 9 -the degree of completeness of said process ($\pi$) in the control vessel.

The degree of completeness of the air dissolution process in kerosene ($\pi$) with time in these two vessels is calculated from the formula:

$$\pi = (P_c - P_3)/(P_i - P_e)$$

wherein $P_i$—initial air pressure in the vessels, MPa
$P_e$—equilibrium air pressure in the vessels, MPa
$P_c$—current air pressure in the vessels, MPa The curves shown in FIGS. 3 and 4 demonstrates that the composition according to the present invention has the ability of hindering the passage of molecules from the gas phase into the liquid.

EXAMPLE 11

A composition of the following formula is used: 1 part by mass of a polymer and 1 part by mass of a filler. The polymer is cross-linked polyacrylamide. The filler comprises hollow glass capsules with a density of 210–290 kg/m$^3$. The testing of the protective agent is performed on the surface of water. The amount of the protective composition is 1.5 kg per m$^2$ of the surface. The degree of the equilibrium swelling of the polymer is 100.

Tests are performed under conditions specified in Example 10 hereinabove. The test results show that during 5 hours the air pressure in the vessel containing water with the protective covering is substantially unchanged, whereas the air pressure in the control vessel approaches the equilibrium pressure.

Therefore, from the above Examples it is seen that the composition and method according to the present invention effectively protect the surface of a liquid from the heat- and mass- transfer, thus lowering irrevocable losses of the liquid. At the same time, this contributes to prevetion of pollution of the atmosphere with toxic products. Furthermore, the present invention makes it possible to retain unchanged quality of liquid products.

What is claimed is:

1. A method for protection of the liquid surface from heat- and mass-transfer in the liquid-gas system comprising application, onto the surface of the protected liquid, of a mixture comprising a crosslinked polymer limitedly swelling in said liquid in an amount of from 0.1 to 2 kg per m$^2$ of the liquid surface with a neutral filler to the protected liquid and having density lower than the density of the protected liquid at a mass ratio of the polymer to the filler ranging from 1:1 to 1:10, upon contacting the liquid the polymer swells with the formation of a continuous gel-like covering which hinders the heat- and mass-transfer.

2. A method according to claim 1, wherein the polymer is used in a mixture with a filler neutral to the liquid to be protected; wherein as the filler, use is made of hollow glass capsules whose density is lower than the density of the liquid to be protected, at a mass ratio of the polymer to the filler ranging from 1:1 to 1:10.

3. A method according to claim 1, wherein as the polymer a copolymer of butylacrylate and acrylonitrile is used.

4. A method according to claim 1, wherein as the polymer a copolymer of ethylene and propylene is used.

* * * * *